United States Patent [19]

Sano

[11] Patent Number: 5,953,493

[45] Date of Patent: Sep. 14, 1999

[54] METHOD OF GENERATING A MOTION COMMAND FOR A ROBOT

[75] Inventor: Masatoshi Sano, Kakogawa, Japan

[73] Assignee: Kawasaki Jukogyo Kabushiki Kaisha, Kobe, Japan

[21] Appl. No.: 08/864,891

[22] Filed: May 29, 1997

[30] Foreign Application Priority Data

May 30, 1996 [JP] Japan ................................. 8-137287

[51] Int. Cl.⁶ ........................... G05B 15/00; G05B 19/04
[52] U.S. Cl. ................................. 395/80; 395/85; 395/87
[58] Field of Search ................................. 395/80, 85, 87; 364/513, 170

[56] References Cited

U.S. PATENT DOCUMENTS

| | | | |
|---|---|---|---|
| 4,403,281 | 9/1983 | Holmes et al. ........................... | 364/170 |
| 4,453,221 | 6/1984 | Davis et al. ............................. | 364/513 |
| 4,685,067 | 8/1987 | French et al. ........................... | 364/513 |

FOREIGN PATENT DOCUMENTS

A-6-114762  4/1994  Japan .

*Primary Examiner*—Paul P. Gordon
*Assistant Examiner*—Carolyn T. Baumgardner
*Attorney, Agent, or Firm*—Oliff & Berridge, PLC

[57] ABSTRACT

A method of generating a motion command for a robot, comprises providing a constant velocity region between an acceleration region when starting and a deceleration region when stopping for every repetitive period when moving the robot throughout a predetermined distance while periodically repeating the start/stop throughout a shorter distance than the predetermined distance.

3 Claims, 3 Drawing Sheets

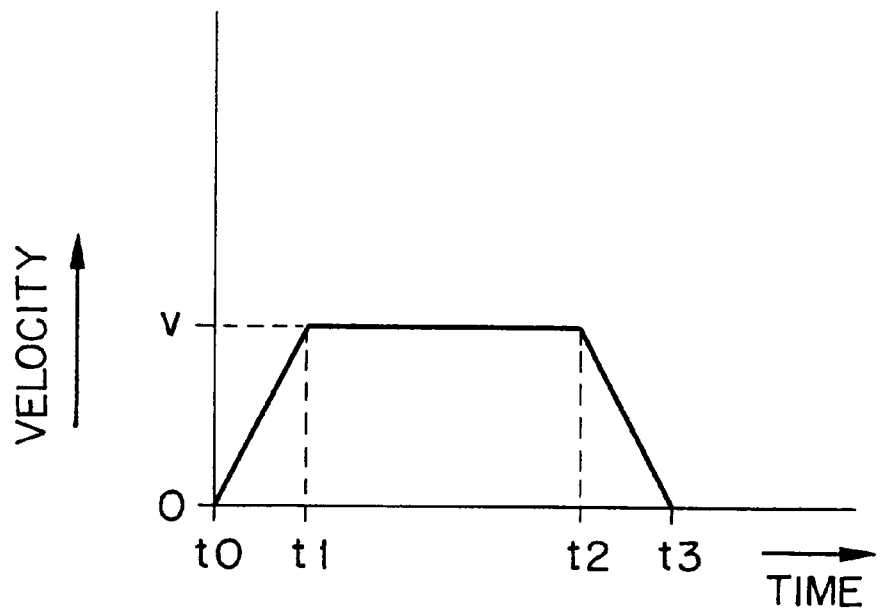
F I G. 1A
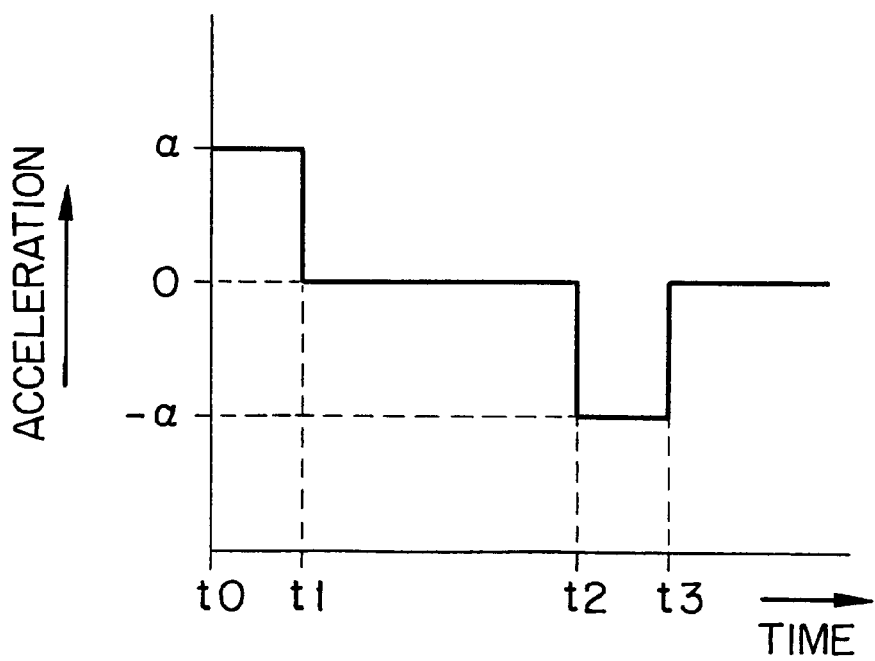
F I G. 1B

METHOD OF GENERATING A MOTION COMMAND FOR A ROBOT

BACKGROUND OF THE INVENTION

1. Field of the Invention

The present invention relates to a method of generating a motion command for a robot, which is capable of avoiding a influence by natural vibrations when motioning an industrial robot on the basis of a preset motion plan.

2. Related Background Art

If a motion of a robot is repeated at a short pitch, and when a repetitive period approximates the number of natural vibrations of the robot, an arm or the like tends to vibrate, and it is difficult to control it at a high precision. For example, in the case of effecting spot welding of a plurality of portions at a short interval by use of a robot for spot welding, a motion plan for one path goes as shown in FIG. 5A. To be specific, there are repeated an acceleration region till a point of time ta at which a velocity v comes to a maximum velocity, and a deceleration region extending from the point of time ta to a point of time td. According to this motion plan, there is performed a motion at a fixed acceleration α in the acceleration region, and a decelerating motion at a fixed deceleration -α in the deceleration region. Variations in the fixed acceleration a and in the fixed deceleration -α are expressed as shown in FIG. 5B.

The acceleration and deceleration regions shown in FIG. 5B are equivalent to a state where an external force acts on the robot as viewed from a driving side. When the repetitive period of the external force by the acceleration and the deceleration comes to several Hz, this is approximate to the number of natural vibrations of the robot. When the repetitive period of the external force approximates the number of natural vibrations of the robot, it hard to control the motion of the robot, with result that the vibrations are easily produced.

The prior art for restraining residual vibrations based on the natural vibrations of the robot is disclosed in, e.g., JP-A-6-114762. According to this prior art, the residual vibrations when finishing the motion are restrained by measuring a natural vibration period of the robot arm and executing the motion command so that one of an acceleration time and a deceleration time becomes a multiple of an integer of the natural vibration period.

When trying to restrain the natural vibrations from occurring by the method disclosed in JP-A-6-114762, it is required that the number of natural vibrations be at first precisely measured. In, e.g., a jointedl-arm robot, however, the number of natural vibrations changes depending on a position and posture of the robot, and hence there must be complicated processes of measuring the number of natural vibrations corresponding to the variations thereof and carrying out the acceleration and deceleration with a period multiplied by an integer thereof.

SUMMARY OF THE INVENTION

It is a primary object of the present invention to provide a method of generating a motion command for a robot, which method is capable of reducing an influence of natural vibrations with a simple construction.

According to one aspect of the present invention, a method of generating a motion command for a robot, comprises the step of providing a constant velocity region between an acceleration region when starting and a deceleration region when stopping for every repetitive period when moving the robot throughout a predetermined distance while periodically repeating the start/stop throughout: a shorter distance than the predetermined distance.

According to the present invention, the constant velocity region is added between the acceleration region and the deceleration region with every period of the repetitive motion. Although the acceleration region and the deceleration region are equivalent to a state where an external force corresponding to the acceleration acts, the constant velocity region is added therebetween. Accordingly, the equivalent external force acting in the acceleration region is temporarily cut off in the constant velocity region, and again acts as it does in the deceleration region. The time in the acceleration and deceleration regions is reduced by providing the constant velocity region, and the time for which the equivalent external force acts is also decreased. Even in the case of motion with the repetitive period approximate to the number of natural vibrations of the robot, as the time for which the equivalent external force acting in the acceleration and deceleration regions is reduced, the natural vibrations can be easily reduced.

According to another aspect of the present invention, a method of generating a motion command for a robot comprises the steps of reducing an acceleration time when starting and a deceleration time when stopping during each repetitive period if a periodic start/stop repetition is included in a motion plan of the robot, and providing a constant velocity region between an acceleration region and a deceleration region.

According to the present invention, the robot motion plan temporarily generated includes the periodic acceleration/deceleration repetition, the time needed for the acceleration and the deceleration is reduced by adding the constant velocity motion between the acceleration and the deceleration. It is therefore possible to reduce an influence of the natural vibrations by modifying the motion plan.

Further, according to the present invention, the robot performs spot welding at each stop point.

The robot carries out the spot welding as a repetitive motion, and hence the spot welding that might be repeated at a short pitch can be quickly executed at a high accuracy while reducing the influence of the natural vibrations.

BRIEF DESCRIPTION OF THE DRAWINGS

Other objects and advantages of the present invention will become apparent during the following discussion in conjunction with the companying drawings, in which:

FIGS. 1A and 1B are a time chart showing a motion command about one path on the occasion of repetitions at a short pitch in one embodiment of the present invention;

DESCRIPTION OF THE PREFERRED EMBODIMENT

FIG. 1 shows a motion plan about one path elccording to a motion plan generated in one embodiment of the present invention. FIG. 1A shows a change in velocity. FIG. 1B shows a change in acceleration that corresponds to the change in velocity. The motion starts at a basic point of time t0. An acceleration region with a fixed acceleration α extends from the basic point of time t0 to a point of time t1, wherein the velocity varies from 0 to v. A constant velocity region extends from the point of time t1, to a point of time t2, wherein the constant velocity is expressed by v, and the acceleration is 0. A deceleration region extends from the point of time t2 to a point of time t3, wherein a deceleration -α is constant, and the velocity varies from v to 0.

Figure 5A:
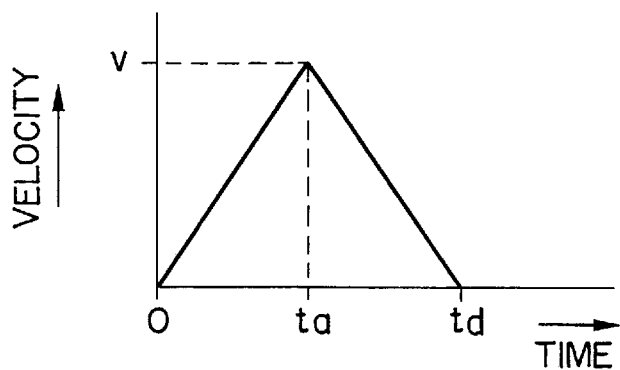
FIGS. 5A and 5B are a time chart showing a motion plan with respect to one path for the repetitive motion at a short pitch in the prior art.
Figure 5B:
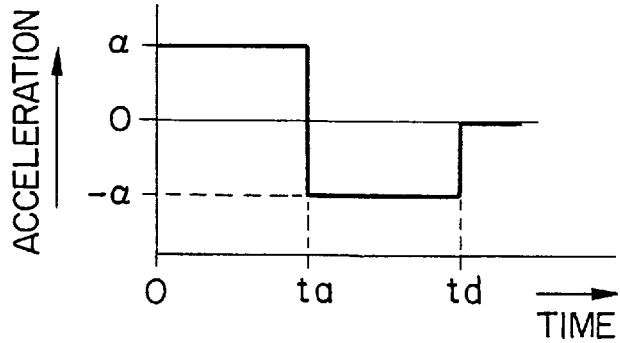

The acceleration α and the deceleration -α are defined as maximum acceleration and deceleration that are determined by a torque of a driving source such as a motor and by an inertia of each shaft of the robot. If a moving distance of motion of the robot is sufficiently long, the motion is accelerated at the maximum acceleration from the point of time t0, and the acceleration is stopped when reaching a constant velocity at the point of time t1. Then, the robot shifts to a constant velocity motion. If the sufficient distance can not be taken at a short pitch, however, as illustrated in FIG. 5, the robot motions in the acceleration region and deceleration region with no constant velocity region. In accordance with this embodiment, as shown by the period t1–t2 in FIG. 1A, the constant velocity region is forcibly added, and the time for which the acceleration and deceleration operate is reduced, whereby an influence of natural vibrations can be reduced.

Figure 2:
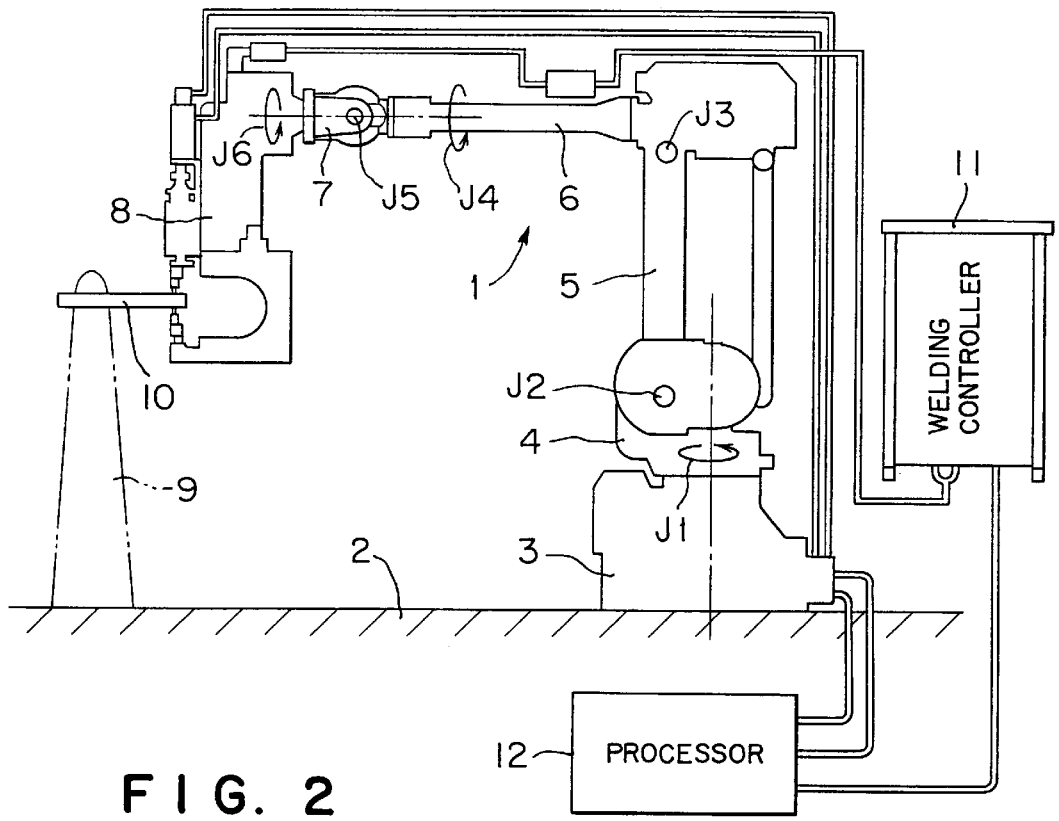
FIG. 2 is a schematic side view illustrating a whole construction of a robot for spot welding.

FIG. 2 schematically illustrates a construction of a robot 1 motioned as shown in FIGS. 1A and 1B. The robot 1 is classified as an industrial robot for spot welding, and includes a base 3 fixed to a floor 2. The robot 1 is of a jointed-arm type capable of rotating about six shafts J1, J2, J3, J4, J5, J6. The base 3 is mounted with a rotary stand 4 rotatable about the first shaft J1 perpendicular to the surface of the floor 2. A lower edge of a lower arm 5, which is capable of angularly displacing back and forth about the second shaft J2 parallel to the surface of the floor 2, is connected to the rotary stand 4. An upper edge of the lower arm 5 is provided with the third shaft J3 parallel to the second shaft J2. A proximal edge of an upper arm 6, which is capable of angularly displacing up and down about the third shaft J3, is connected to the upper edge of the lower arm 5. Connected to a distal edge of the upper arm 6 is a wrist 7 capable of angularly displacing about the fourth and fifth shaft J4, J5. The fourth shaft J4 extends in an axial direction of the upper arm 6, while the fifth shaft J5 is perpendicular to the fourth shaft J4. The wrist 7 is fitted to a spot welding gun 8 through the sixth shaft J6. The sixth shaft J6 is perpendicular to the fifth shaft J5.

A support 9 is provided with a spacing from the base 3 and supports a material 10 to be welded at a given height from the surface of the floor 2. The material 10 as a work is spot-welded by the spot welding gun 8. A spot for the spot welding is predetermined, and the robot 1 consecutively executes the spot welding on a plurality of spots of the material 10. A welding controller 11 controls the spot. A computer-assisted processor 12 controls the whole of the motion of the robot 1 and the spot welding.

Figure 3:
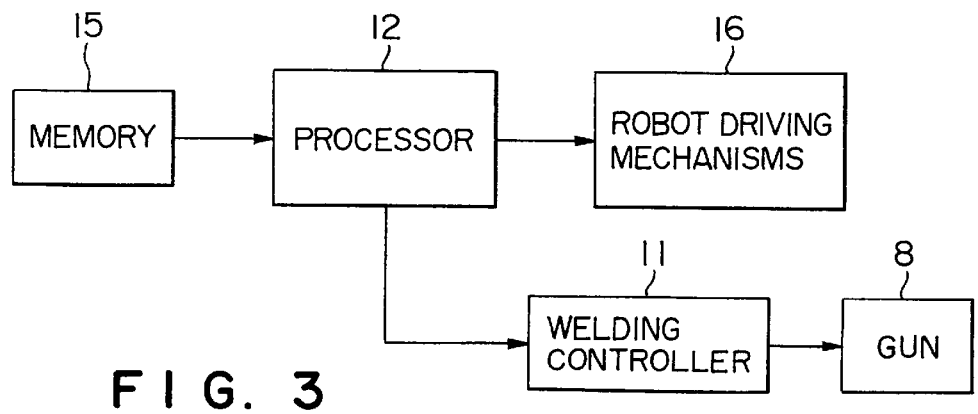
FIG. 3 is a block diagram schematically showing an electric construction of a spot welding apparatus shown in FIG. 2.

FIG. 3 schematically shows an electric construction of the spot welding apparatus in FIG. 2. The components corresponding to those of the whole construction shown in FIG. 2 are marked with the like reference numerals, and a repetitive explanation is omitted. Connected to the processor 12 is a memory 15 for storing data about the welding spots on the material 10 as well as about welding conditions in the respective welding spots. The processor 12 issues motion commands to the robot 1 in FIG. 2 as the motion commands to the shafts J1–J6 of the robot 1, or as the motion commands to the welding controller 11 for controlling the gun 8 in accordance with the data stored in the memory 15.

Figure 4:
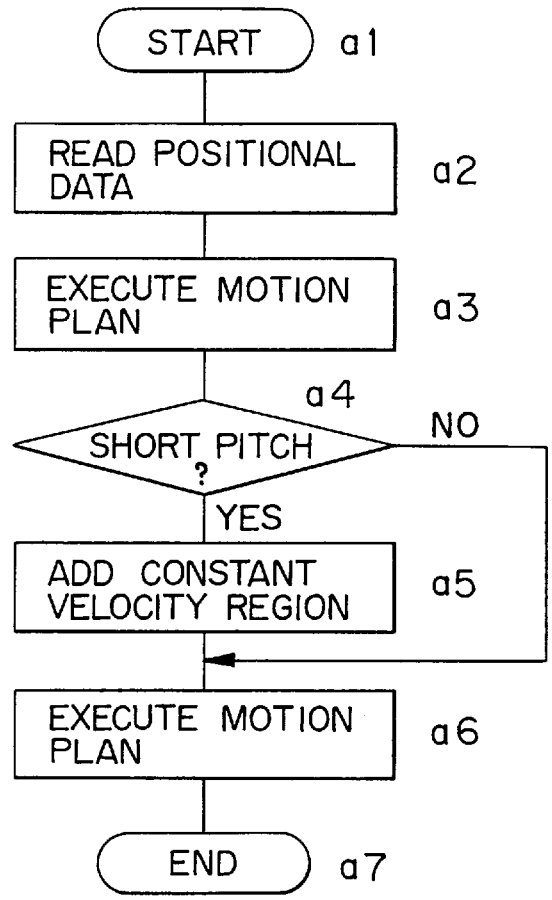
FIG. 4 is a flowchart showing an operation of a processor FIG. 3.

FIG. 4 shows a method of generating the motion commands in the processor 12 in FIG. 3. The motion plan starts with step a1. Read from the memory in step a2 are the positional data about the predetermined welding spots on the material 10 to be welded for the robot 1 in FIG. 2. In step a3, the motion plan for sequentially shifting the welding spot read from the memory 15, is generated for one path. The processes from reading the positional data in sep a2 to the operating plan in step a3 are basically the same as those executed by a prior art industrial robot.

In step a4, whether or not the read positional data is a pitch shorter than a predetermine distance is judged. When judging that there is a repetition at the short pitch, a constant velocity region as shown in FIG. 1A is added in step a5. After adding the constant velocity region in step a5, or alternatively if judged not to be the short pitch in step a4, the processor 12 in FIG. 3 issues the motion commands to driving mechanism 16 for the respective shafts of the robot in step a6. The generation of the motion commands for one path is finished in step a7.

A fundamental concept about the addition of the constant velocity region in step a5 will hereinafter be explained. Generally, the following first: formula is established:

$$L=\alpha*Ta^2/2+V*Ts+d*Td^2/2 \tag{1}$$

where L is the moving distance, α is the acceleration, Ta is the acceleration time, V is the constant velocity, Ts is the constant velocity time, d is the deceleration, and Td is the deceleration time. Note that "*" indicates the multiplication, while "/" indicates the division in this formula.

Herein, the following formula 2 comes out:

$$V=\alpha*Ta=d*Td \tag{2}$$

Therefore, α=V/Ta, and d=V/Td. Then, when deleting α and d, the following third and fourth formulae are obtained:

$$L=Ta*V/2+V*Ts+Td*V/2 \tag{3}$$

$$V=2L/(Ta+2*Ts+Td) \tag{4}$$

If the initial motion plan values in step a3 are set such as V=V1, Ta=Ta1, Ts=Ts1, Td=Td1, and L=L1, the following fifth formula is obtained:

$$V1=2L1/(Ta1+2Ts1+Td1) \tag{5}$$

Herein, when a is determined as in the sixth formula, the following seventh formula is obtained:

$$A=2/(Ta1+2Ts1+Td1) \tag{6}$$

$$V1=A*L1 \tag{7}$$

Next, supposing that V=V2, Ta=Ta2, Ts=Ts2, and Td=Td2, the following eighth formula is obtained.

$$V2=2L1/(Ta2+2Ts2+Td2) \quad (8)$$

Herein, there must be relationships defined by the following ninth and tenth formulae;

$$V1=\alpha*Ta1=d*Td1 \quad (9)$$

$$V2=\alpha*Ta2=d*Td2 \quad (10)$$

Therefore, the following eleventh and twelfth formulae are obtained:

$$Ta2=V2/\alpha=V2*Ta1/V1 \quad (11)$$

$$Td2=V2/d=V2*Td1/V1 \quad (12)$$

Transformations are given as will be shown in the following thirteenth, fourteenth and fifteenth formulae:

$$V2 = 2La/(V2*Ta1/V1+2Ts2+V2*Td1/V1)$$

$$= 2L1*V1/(V2*Ta1+2Ts2*V1+V2*Td1)$$

$$= 2L1*V1/(V2(Ta1+Td1)+2Ts2*V1) \quad (13)$$

$$2L1*V1=(Ta1+Td1)*V2^2+2Ts2*V1*V2 \quad (14)$$

$$(Ta1+Td1)*V2^2+2Ts2*V1*V2-2L1*V1=0 \quad (15)$$

When substituting the seventh formula into the fifteenth formula, the next sixteenth formula is obtained:

$$(Ta1+Td1)*V2^2+2Ts2*A*L1*V2-2L1*A*L1$$

$$=(Ta1+Td1)*V2^2+2Ts2*A*L1*V2-2A*L1^2$$

$$=0 \quad (16)$$

The sixteenth formula becomes a quadratic equation of V2, and hence V2 is calculated as shown in the following seventeenth formula:

$$V2=(-Ts2*A*L1\pm SQRT((Ts2*A*L1)^2+2*A*L1^2*(Ta1+Td1)))/(Ta1+Td1)$$

$$=L1*(-Ts2*A+SQRT((Ts2*A)^2+2A^2*(Ta1+Td1)))/(Ta1+Td1) \quad (17)$$

where SQRT( ) represents a square root with respect to ( ), and, V2 being positive, only the sign "+" of "±" has a meaning.

From the seventeenth formula, the parameter B is defined as shown in the following eighteenth formula:

$$V2/L1=(-Ts2*A+SQRT((Ts2*A)^2+2A^2*(Ta1+Td1))/(Ta1+Td1)$$

$$=B \quad (18)$$

When using the eighteenth formula, the following nineteenth formula is obtained from the eleventh formula:

$$Ta2=Ta1*V2/V1$$

$$=Ta1*(V2/L1)/(V1/L1)$$

$$=Ta1*B/A \quad (19)$$

Similarly, the following twentieth formula is obtained from the twelfth formula:

$$Td2=Td1*B/A \quad (20)$$

When $Ts1 \geq Ts2$, the time $Ts1$ in the constant velocity region is sufficiently long in the initial motion plan. Hence, there is no necessity for forcibly adding the constant velocity region, and the motion command is executed based on the initial motion plan.

In accordance with the embodiment discussed above, the natural vibrations, though restrained for the repetitive motion of the robot for performing the spot welding, can be also restrained similarly for repetitive motions applied otherwise.

It is apparent that, in the present invention, a wide range of different working modes can be formed based on the invention without deviating from the spirit and scope of the invention. The present invention is not restricted by its specific working modes except being limited by the appended claims.

What is claimed is:

1. A method of generating a motion command for a robot, comprising the steps of:

a) providing a predetermined-acceleration region when starting, b) providing a constant-velocity region after said predetermined-acceleration region, c) providing a predetermined-deceleration region when stopping after said constant-velocity region, and d) detecting a distance between a start point and a stop point among a plurality of start and stop points to provide another constant-velocity region between said predetermined-acceleration and deceleration regions if the distance is shorter than a predetermined distance, thus reducing an acceleration time for said predetermined-acceleration region and a deceleration time for said predetermined-deceleration region.

2. The method according to claim 1, wherein said steps a) to d) are repeated throughout the plurality of the start and stop points.

3. The method according to claim 2, wherein said robot performs spot welding at each stop point.

\* \* \* \* \*